May 13, 1952 C. G. ALLEN 2,596,517
TRACTION DEVICE FOR VEHICLE WHEELS
Filed June 16, 1949 2 SHEETS—SHEET 2
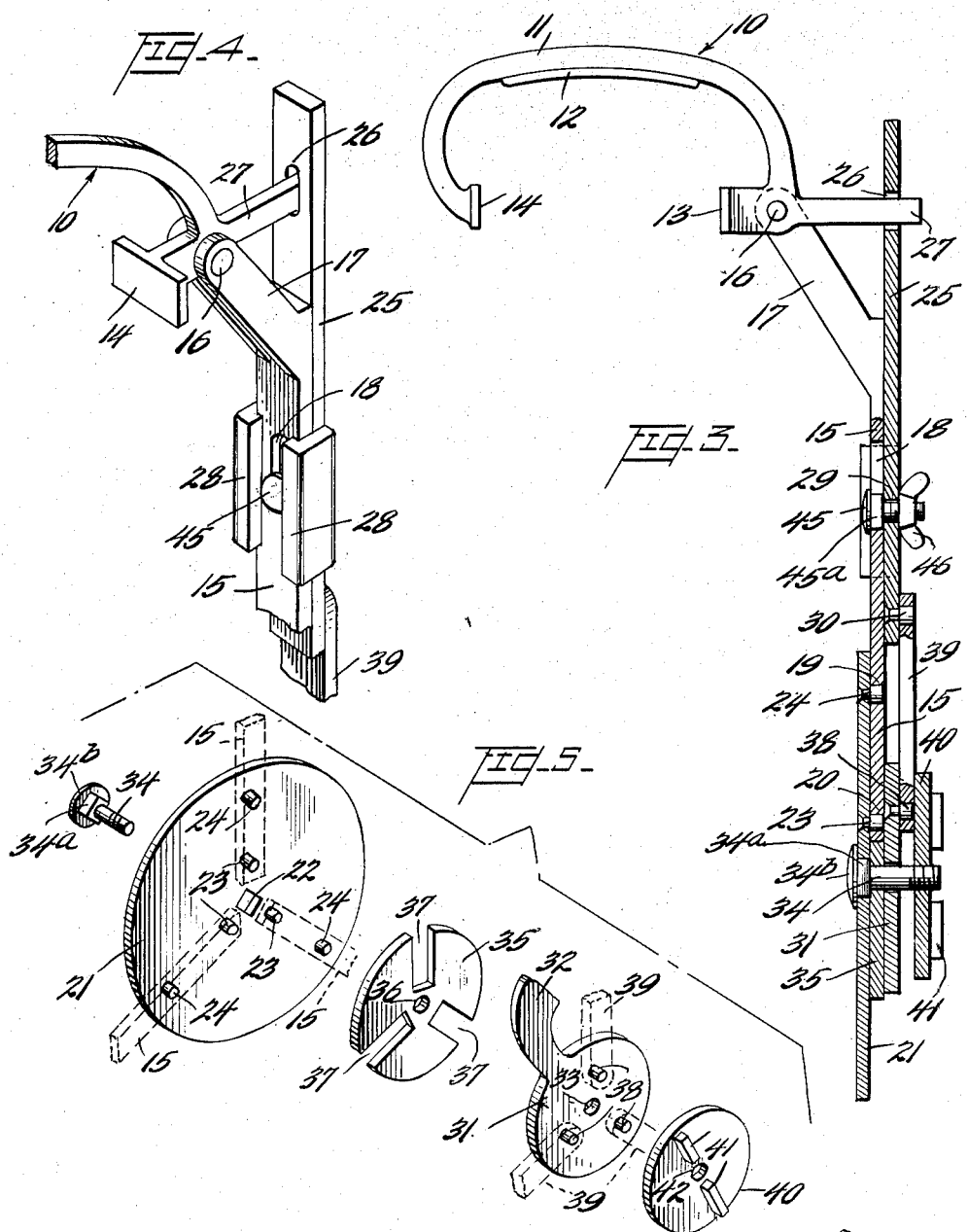

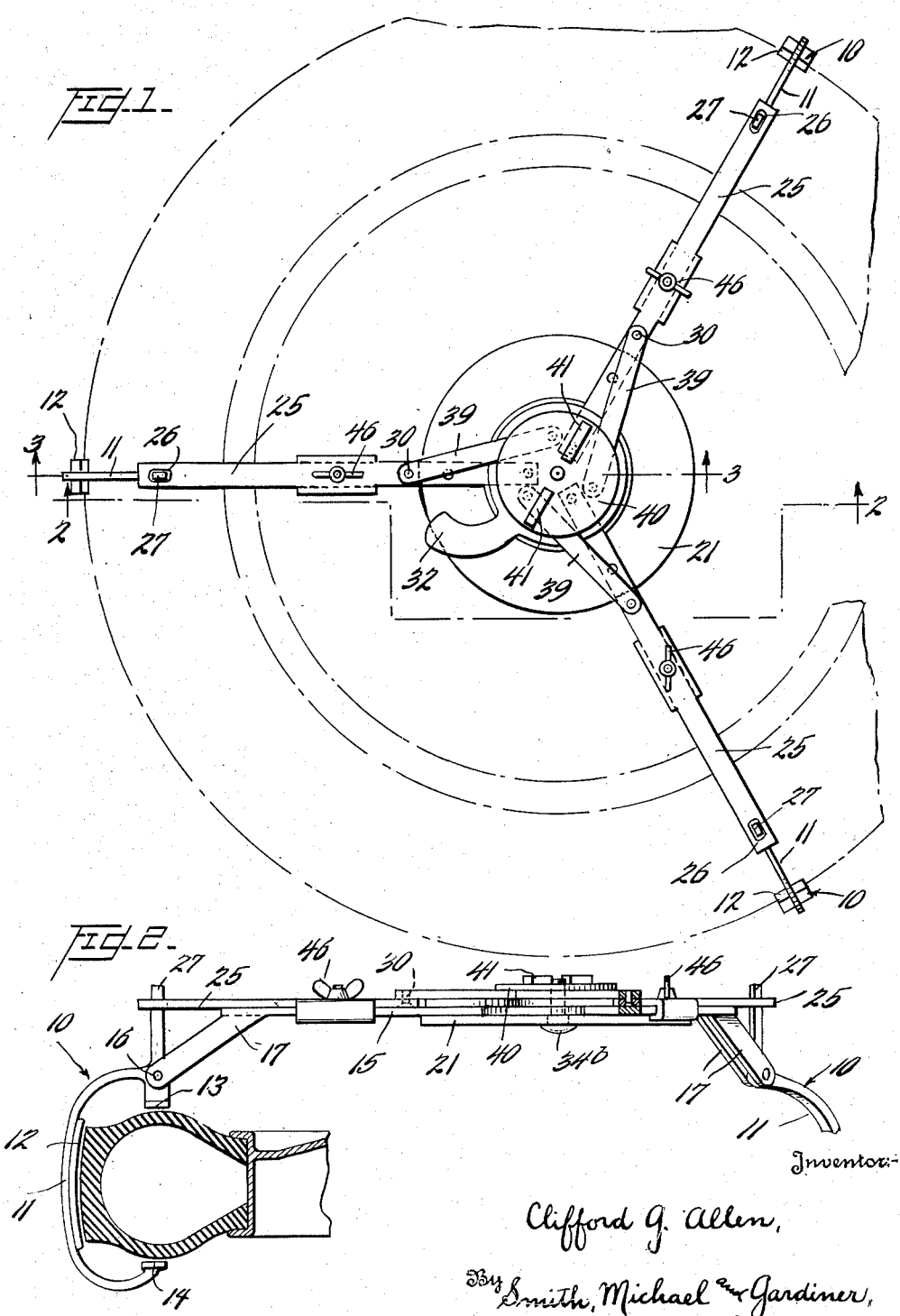

Patented May 13, 1952

2,596,517

UNITED STATES PATENT OFFICE 2,596,517

TRACTION DEVICE FOR VEHICLE WHEELS

Clifford G. Allen, Hartville, Ohio

Application June 16, 1949, Serial No. 99,541

10 Claims. (Cl. 152—225)

1

My present invention relates to removable traction devices for vehicle wheels, and has particular reference to a device for application to a power-driven, tire-equipped, wheel of an automobile, truck, or the like, to increase the traction thereof in mud, sandy soil, or in snow or ice.

It is an object of my present invention to provide a removable and replaceable traction device for vehicle wheels which may be readily applied to and removed from a tire-equipped vehicle wheel by a single operator without assistance or the use of tools; one which is self-cleaning; one which minimizes tire wear; one which may be used with completely or partially inflated tires; one which will remain on the wheel when applied thereto by the operator; and one which is strong and sturdy and which may be readily repaired when parts thereof become broken or inoperative. These objects are accomplished by the provision of a relatively inexpensive, removable and replaceable, traction device of ample strength which may be readily applied to a vehicle wheel and be retained in operative position thereon with the parts in compression as distinguished from tension.

It is a further object of my present invention to provide a removable and replaceable traction device which is relatively easy and inexpensive to manufacture, which is strong and durable, and which is highly efficient in the purposes for which designed.

In the accompanying drawings, wherein for the purpose of illustration I have shown a preferred embodiment of my present invention:

Fig. 1 is a side elevation of the preferred form of my present invention showing the same mounted on, or applied to, a conventional, tire-equipped vehicle wheel, the tire of which is illustrated in dot and dash lines and in fragmentary side elevation;

Fig. 2 is a horizontal sectional view of the device shown in Fig. 1 and taken on the line 2—2 of Fig. 1;

Fig. 3 is a sectional view, on an enlarged scale, of the device shown in Fig. 1 and taken on the line 3—3 of Fig. 1;

Fig. 4 is a fragmentary, perspective view, on an enlarged scale, of a detail of the present invention showing the construction at the outer ends of each of the several radially disposed arms, and;

Fig. 5 is an exploded view, in perspective, showing the four plates which operate the tire-gripping arms of the traction device of my present invention.

2

Referring more specifically to the disclosure of the accompanying drawings, wherein like reference numerals have been employed to designate like parts throughout the several views, the removable, replaceable traction device of my present invention may comprise, in general, a plurality of curved arms which I designate traction grips, each of which arms partially encircles the peripheral portion of the tire of the wheel at approximately equal intervals when the device is applied to a tire-equipped vehicle wheel, together with a manually operable mechanism located centrally of the wheel at or adjacent the hub portion thereof and including parts which are adapted to move the said traction grips radially toward and away from the tread portion of the tire. As each of the traction grips and their respective actuating mechanisms are identical, a description of one will suffice for all. While I have elected to illustrate and describe three traction grips and three radial arms for actuating the same, it is to be definitely understood that two or more traction grips and a corresponding member of radial arms might well be employed.

Each traction grip 10, as viewed from the side (see for example Fig. 3) is partially elliptical, and is provided with a road-engaging, outer edge 11, a tire tread engaging portion 12 on its inner surface, and two opposed portions 13 and 14 which are disposed adjacent the opposite side walls of a tire near that portion thereof where the tire has its greatest transverse cross-section.

The portions 12, 13, and 14 just referred to, may be formed integrally with members 11 or may be rigidly or adjustably secured to said members, and, preferably, the tread-engaging portion 12 is so shaped and dimensioned as to provide contact with substantially the entire width of the tread portion of the tire when the device is mounted thereon. The spacing between the opposed faces of portions 13 and 14 is such that these portions are preferably slightly spaced from the side walls of the tire when the device is in applied position thereon, as shown in Fig. 2 of the accompanying drawings.

Each traction grip 10 is pivotally supported on a fulcrum arm or member 15 by means of a pivot pin 16, which pin 16 passes through the arms of a bifurcated end portion 17 located at the outer end of each arm or member 15, it being noted that the bifurcated end portion is disposed at an obtuse angle with respect to the plane of the arm or member 15. By virtue of this construction, each traction grip 10 is freely swingable on its pivot pin 16 and between the spaced, parallel arms of the bifurcated end portion 17. Each fulcrum arm 15 is preferably a relatively strong metal bar of rectangular transverse cross section, and is provided with an elongated slot 18 which extends longitudinally of the bar about midway of the ends thereof, and with a pair of spaced apertures 19 and 20 for the reception of pins to be hereinafter described, the aperture 20 being relatively close to the inner end of the fulcrum arm, while the aperture 19 is preferably located about half way between aperture 20 and the adjacent end of the slot 18. The angularity of the bifurcated arm portion 17 with respect to the plane of the remainder of arms 15, provides clearance for the mounting and operation of certain parts to be hereinafter described.

As an effective means for anchoring the inner ends of the fulcrum arms 15 and to maintain the same in proper radial positions, I provide a substantially flat plate 21, which plate is preferably circular, and is provided with a non-circular aperture 22 at the center thereof and with aligned, spaced pairs of pins 23 and 24 projecting from one face thereof. These pins 23 and 24 are arranged in three sets or pairs, with the pins of each pair disposed in a plane which is radial with respect to the aperture 22 at the center of the plate, the three radial planes in which the respective pairs of pins are disposed being approximately 120° apart in a construction employing three radially extending fulcrum arms 15. The spacing between each of the pins 23 and 24 corresponds to the spacing between the apertures 19 and 20 of fulcrum arms 15, so that said pins may pass through said apertures to lock or anchor the fulcrum arms to plate 21, as will be readily seen upon inspection of Figs. 3 and 5 of the accompanying drawings.

To swing each traction grip 10 on its pivotal mounting 16, I provide slide bars 25 each having a longitudinal slot 26 near its outer end through which passes an arm 27 integral with the traction grip, it being noted that each arm 27 is disposed in the same general plane as the portions 13 and 14, as clearly shown in Fig. 3. To express this relationship in another way, it may be said that the arms 27 extend at right angles to the general plane of the tire-equipped wheel when the traction device is applied thereto. The arms 27 function as levers for swinging the traction grips 10 in opposite directions about their pivotal mountings as the slide bars 25 are reciprocated with respect to the fulcrum arms 15. Each slide bar 25 is provided intermediate its ends and extending along a portion of its edges, with a pair of flanges 28 which, together, provide a T-shaped slot on one face of the slide bar 25, the flat fulcrum arm 15 fitting within this slot so that said slide bar is held close to, and is slidable on, the fulcrum arm 15, being guided in its reciprocating movements with respect to said fulcrum arm by flanges 28. If preferred, a pair of flanges similar to flanges 28 could be provided on the fulcrum arm 15 and arranged to embrace and guide the slide bar 25, this being a mere reversal of parts which does not require illustration, and which will be readily apparent to anyone reasonably skilled in the art to which the present invention relates. An aperture 29 is provided in each slide bar 25 about midway between the ends of the T-shaped slot provided by flanges 28, and a pin 30 projects from the inner end of each slide bar 25 as illustrated in Fig. 3.

To effect simultaneous radial movements of the radially disposed slide bars 25, I provide a link-actuating plate 31, which plate is provided with a handle 32 which extends substantially radially from the periphery of said plate, said handle being adapted to be grasped by the operator and moved circumferentially to effect oscillation of said plate. A circular hole 33 is provided at the center of plate 31 and is adapted to receive a bolt 34 on which said plate 31 is freely rotatable. Bolt 34 has a non-circular portion 34$^a$ immediately beneath the enlarged head portion 34$^b$ thereof, which non-circular portion corresponds in configuration to non-circular hole 22, and fits therein to retain the plate 21 against rotation relative to the said bolt. Intermediate plates 21 and 31, is a third plate 35 provided with a central, circular aperture 36 to receive bolt 34, this third plate 35 being further provided with three radial slots 37 extending at angles of 120° to each other, said slots being of proper dimensions to receive therein the inner ends of the three fulcrum arms 15. Thus the plate 35 makes it possible for the link-actuating plate 31 to rotate on bolt 34 without interference from the inner ends of the fulcrum arms 15 or from pins 23 and 24 which secure said arms 15 to said plate 21. Three pins 38 are fixed to, and project from, the same face of the link-actuating plate 31, and links 39, preferably in the form of straight, flat bars perforated at each end, are each pivoted at one end on one of the pins 38 while their opposite ends are pivoted on pins 30 at the adjacent ends of the slide bars 25. By virtue of this construction, oscillation of link-actuating plate 31 by its handle 32 will effect radial reciprocation of the slide bars 25.

I also mount on bolt 34 a link lock plate 40 preferably of disk-like form, and having two or more radially-disposed wings or ribs 41 projecting outwardly from a face thereof to provide means facilitating manual turning of said lock-plate. Lock plate 40 is provided at its center with a tapped hole 42 which enables the lock plate 40 to be screwed onto the threaded outer end of bolt 34, it being noted that engagement of the non-circular aperture 22 with the cooperating non-circular portion 34$^a$ of bolt 34 prevents said bolt from turning during rotation of lock plate 40 as it is tightened and loosened on bolt 34. The assembled relation of the parts above described is fully illustrated in Fig. 3 of the accompanying drawings.

A bolt 45 having a non-circular portion 45$^a$ adjacent the head thereof and having a wing nut or the like 46 threaded on its opposite end, is provided as a means for locking each slide bar 25 to its associated fulcrum arm 15 which supports and guides it, it being noted that the non-circular part 45$^a$ of said bolts fits snugly in the slots 18 in fulcrum arms 15 and that said bolts pass through apertures 29 in the slide bars, whereby the wing nuts may be tightened against the said slide bars to lock the same against movement with respect to the fulcrum arms 15. When the several parts are positioned as shown in Fig. 3, with the wing nuts 46 tightened on bolts 45, the slide bars 25 are rigidly clamped, and the traction grips will be maintained in proper and effective position across the tread portion of the tire.

When the locking plate 40 and wing nuts 46 are loosened, the link-actuating plate 31, the links 39, the slide bars 25, and the traction grips 10 may all be moved simultaneously. If the handle 32 is actuated by the operator to move plate 31 in a counterclockwise direction about bolt 34, as the parts are viewed in Fig. 1, radially outward motion is imparted through links 39 to the slide bars 25, it being particularly noted that the device of my present invention operates by compression and not by tension. As slide bars 25 are moved radially outward, the inner ends of the slots 26 in slide bars 25 contact arms 27 of traction grips 10 to swing said traction grips across the tread portion of the tire (see Fig. 2). When this has been accomplished, locking plate 40 is screwed tight by hand, the wings or ribs 41 providing ample leverage for this purpose, and then the wing nuts 46 are tightened. It will be understood, of course, that when the device is to be applied to a tire-equipped vehicle wheel, the traction grips 10 will be in a position resulting from clockwise movement of said grips about their pivots 16, and that portions 13 of each grip will be placed adjacent the outer side of the tire before actuation of the link-actuating plate 31 and its associated parts, in the manner above described.

When the traction device of my present invention is mounted on a tire-equipped vehicle wheel, it is rigidly retained thereon. As there is a slight clearance between portions 13 and 14 of each of the traction grips and the adjacent inner and outer side walls of the tire, it will be readily apparent that the entire device is free to partake of limited movement in a step-by-step manner, circumferentially of the tire, thus rendering the device self-cleaning and tending to minimize wear on the tire. Partially inflated tires have no detrimental effect on the efficient operation of the device, by reason of the fact that the clearance provided between portions 13 and 14 and the adjacent side walls of the tire is sufficient to permit the bellying-out of the tire casing as it revolves in contact with the ground.

When it is desired to remove the traction device from the vehicle wheel to which it has been applied, it is only necessary to loosen locking plate 40 and the wing nuts 46 and to move handle 32 and plate 31 in a clockwise direction as viewed in Fig. 1, whereupon the slide bars 25 will all move radially inwardly. This inward movement of slide bars 25 causes the outer ends of slots 26 to contact arms 27 and to swing traction grips 10 to open or extended position about their pivots 16, whereupon the entire device may be readily removed from the wheel to which it was formerly applied.

Among the numerous features of the device of my present invention, I desire to point out that the device is of strong and sturdy construction; that the operations of applying and removing the device to and from a tire-equipped vehicle wheel are of a comparatively simple nature requiring only the two hands of the operator and not requiring the use of tools, jacks or the like; that when once applied, the device is securely maintained upon the wheel; that the component parts of the device are of such construction that they may be readily replaced and repaired, when necessary; and that the above-described angularity of the bifurcated ends 17 of the fulcrum arm 15 insure the necessary clearance for the base plate 21 with respect to the decorative hub cap usually mounted at the center or hub portion of a conventional automobile wheel. Furthermore, the outer ends of slide arms 25 and of arms 27 will rotate with the wheel free of any contact with the wheel fender adjacent said wheel.

It is to be understood that the form of my invention shown and described herein is to be taken as the preferred embodiment of the same, and that various changes may be made in the shape, size and arrangement of parts without departing from the spirit of my invention or the scope of the subjoined claims.

Having thus described my invention, I claim:

1. A removable traction device for tire-equipped vehicle wheels, comprising a plurality of circumferentially-spaced traction grips each adapted to extend transversely of, and to overlie, the tread portion of the tire when the device is mounted on said tire-equipped wheel, a centrally-positioned base member, radially-disposed arms secured at their inner ends to said base member with their outer ends terminating adjacent the periphery of the tire at one side thereof, the outer ends of said arms including means for pivotally mounting said traction grips thereon, radially-movable slide bars mounted for longitudinal movement with respect to each of said arms, means to move the slide bars inwardly toward the base member and outwardly therefrom, and means connecting said slide bars and said traction grips whereby inward and outward movement of said bars will swing said traction grips about their pivotal mountings at the ends of said radially-disposed arms and into and out of positions overlying said tread portion.

2. A removable traction device as defined in claim 1, in which separate means are provided to clamp each radially-disposed arm and its associated slide bar in adjusted position.

3. A removable traction device as defined in claim 1, in which the means to move the slide bars inwardly toward the base member and outwardly therefrom comprises a rotatable disk-like member located centrally of the device, means to support said disk-like member for oscillation about its center, a handle for effecting oscillation of said disk-like member, and a plurality of links corresponding in number to the number of traction grips and each pivoted at its inner end to said disk-like member and pivotally connected at its outer end to one of the slide bars, oscillation of said disk-like member effecting simultaneous reciprocation of said slide bars and swinging of the traction grips to and from positions overlying said tread portion.

4. A removable traction device as defined in claim 1, in which the means connecting each of the slide bars and the associated traction grip comprises an arm rigidly secured to each traction grip and extending approximately normal to the plane of each slide bar when the device is positioned on the wheel, each slide bar having a longitudinally-extending slot near its outer end, said arm extending through said slot.

5. A removable traction device as defined in claim 1, in which each traction grip comprises a substantially semi-eliptical arm adapted to partially embrace the tire transversely of the periphery thereof, said grip being swingable on its associated pivotal mounting, an elongated tread-engaging member intermediate the ends of each grip to overlie the tread portion thereof, a second member at the end of each grip adapted to lie adjacent the side of the tire remote from the pivotal mounting of said grip, and a third member on each grip adjacent the pivotal mounting thereof adapted to lie adjacent the side of said tire near said pivotal mounting, the several members being positioned with respect to said tire to provide slight clearance therebetween.

6. A removable traction device for tire-equipped vehicle wheels, comprising a plurality of traction grips adapted to extend transversely of, and to overlie, the tread portion of the tire when the device is mounted on the wheel, a fulcrum member for each traction grip, means to pivotally mount each traction grip on the outer end of an associated fulcrum member, a slide bar longitudinally slidable on each fulcrum member, means connecting each slide bar with a traction grip to effect swinging of the latter about its pivotal mounting when said slide bar is reciprocated, a centrally-positioned disk-like member, means for supporting said disk-like member for oscillation about its axis, a handle to facilitate oscillation of said disk, links each pivoted at its inner end to said disk-like member and at its outer end to one of said slide bars, and a centrally-positioned, fixed disk-like member to which the inner ends of the fulcrum members are secured, the support means for the first-mentioned disk-like member also supporting said second disk-like member.

7. A removable traction device as defined in claim 6, wherein the fixed disk-like member has a non-circular hole at its center, and a bolt having a portion fitting non-rotatably in said non-circular hole extends through said hole and through the first-mentioned disk to provide the supporting means therefor, and wherein a link lock plate having a tapped bore at its center is threaded onto the threads of said bolt, said link lock plate having on its outer face a plurality of wings to facilitate screwing and unscrewing of the said lock plate on said bolt, whereby to clamp the disk-like members and their associated parts or to permit relative movement thereof.

8. A removable traction device as defined in claim 7, wherein the fixed disk-like member is flat and the fulcrum members have their inner ends secured to, and extending radially from, one face thereof; and wherein a bar anchor plate is disposed between said first mentioned disk-like member and said fixed disk-like member, said bar anchor plate having a centrally located hole through which said bolt extends and being provided with a plurality of radial slots each of the proper dimension to receive therein the inner end of one of the fulcrum members, said bar anchor plate having flat surfaces and permitting oscillation of said first-mentioned disk-like member relative to said first fixed disk-like member.

9. A removable traction device for tire-equipped vehicle wheels comprising a plurality of traction grips each adapted to extend transversely of and to overlie the tread portion of the tire when the device is mounted on said wheel, and manually-operable means connected to each of said traction grips to swing them simultaneously inward toward and outwardly away from said tread portion, said manually-operable means including a manually-oscillated member which is located centrally or equidistant from said traction grips, means for supporting the manually-oscillated member to permit oscillation thereof about an axis which is substantially aligned with the wheel axis, and mechanisms connecting said manually-oscillated member with the several traction grips.

10. A removable traction device as defined in claim 9 wherein each of the mechanisms which connects a manually-oscillated member with a traction grip has manually-operable locking means to hold that mechanism against such movement as would effect swinging of the traction grip.

CLIFFORD G. ALLEN.

REFERENCES CITED

The following references are of record in the file of this patent:

UNITED STATES PATENTS

| Number    | Name       | Date          |
|-----------|------------|---------------|
| 1,256,160 | Parish     | Feb. 12, 1918 |
| 2,169,950 | Hamalainen | Aug. 15, 1939 |
| 2,458,522 | MacKay     | Jan. 11, 1949 |
| 2,477,051 | Eisenhauer | July 26, 1949 |